United States Patent [19]

Tedrahn

[11] Patent Number: 4,913,941

[45] Date of Patent: Apr. 3, 1990

[54] REMOVABLE CAR HOOD ORNAMENT APPARATUS

[76] Inventor: Russell Tedrahn, 1915 N. Cherry, Wheaton, Ill. 60187

[21] Appl. No.: 377,893

[22] Filed: Jul. 10, 1989

[51] Int. Cl.[4] ............................................. B60R 13/04
[52] U.S. Cl. ........................................ 428/31; 40/591; 280/727; D12/197
[58] Field of Search ......................... 40/591; 280/727; 428/31; D12/197

[56] References Cited

U.S. PATENT DOCUMENTS

| | | | |
|---|---|---|---|
| 3,678,456 | 7/1972 | Gruber | 40/591 X |
| 3,968,977 | 7/1976 | Wilfert | 428/31 X |
| 4,349,591 | 9/1982 | Kanamori | 40/591 X |
| 4,400,417 | 8/1983 | Kanamori et al. | 428/31 |
| 4,560,597 | 12/1985 | Kanamori | 428/31 |

FOREIGN PATENT DOCUMENTS 1133297 11/1968 United Kingdom ................. 428/31

*Primary Examiner*—Henry F. Epstein
*Attorney, Agent, or Firm*—Douglas B. White

[57] ABSTRACT

Generally there is provided a detachable ornament for the hood of an automobile which is arranged to project through a small opening provided in the hood. A shaft member is arranged with the ornament on its upper end and a key member at its lower end. A bracket affixed to the vehicle positions a plate member under the hood opening. The plate member is arranged with an opening similar to the hood opening but also includes a transverse slot for receipt of the protruding key member. A coil spring, provided in one embodiment on the shaft and in a second embodiment within the bracket, urges the shaft member upwardly when inserted within the bracket. As a result, when the shaft member is inserted through the hood, the spring is compressed as the key member is pressed through the keyhole slot. The shaft is then rotated to cause the key member prongs to lock against the plate member under force of the spring.

7 Claims, 1 Drawing Sheet

REMOVABLE CAR HOOD ORNAMENT APPARATUS

BACKGROUND OF THE INVENTION

1. Field of the Invention

The present invention relates generally to mountings of hood ornaments for vehicles, and particularly to methods and devices designed to prevent the theft of valuable hood ornaments.

2. Description of the Prior Art

In the prior art hood ornaments have traditionally been affixed rigidly to the front hood of the vehicle. As such they have become a prime target for vandalism and thefts. While efforts have been made to design collapsible structures to prevent damage when the ornaments are struck, no design has been developed for an ornament which is easily removed for storage to prevent such damage or theft. A version of the collapsible ornament is described in U.S. Pat. No. 4,560,597.

SUMMARY OF THE INVENTION

Accordingly it is a principal object of the present invention to provide a hood ornament attachment apparatus which is easily inserted into and mounted upon the hood of an automobile without special tools or detailed instructions.

It is another object of the present invention to provide such a hood ornament apparatus which not only is easily removed and stored but which also does not include loose parts or oily mechanisms which might get lost or soil materials with which it comes into contact.

It is yet a further object of the present invention to provide a removable hood ornament device which may be easily and inexpensively replaced should it be lost or stolen.

Generally there is provided a detachable ornament for the hood of an automobile which is arranged to project through and attach within a small opening in the hood. A shaft member is arranged with an ornament on its upper end and a key member at its lower end. A bracket affixed to the hood (or to the core support of the vehicle) positions a plate member under the hood opening. The plate member is arranged with an upper opening similar to the hood opening, but also includes a transverse slot (keyhole) for receipt of the protruding key member. A coil spring, provided in one embodiment on the shaft and in a second embodiment within the bracket, urges the shaft member upwardly. As a result when the shaft member is inserted through the hood, the spring is compressed when the key member is inserted through the slot. The shaft is then rotated to cause the key member to lock against the plate member under force of the spring.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

DESCRIPTION OF THE PREFERRED EMBODIMENT

Figure 1:
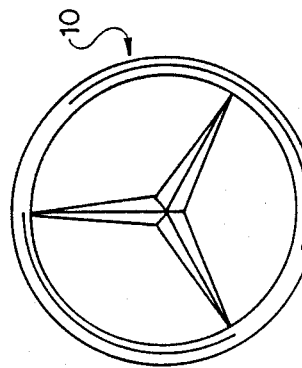
FIG. 1 is a cross sectional view of the hood ornament of the present invention showing a first embodiment wherein the spring is housed within the bracket under the hood.
Figure 3:
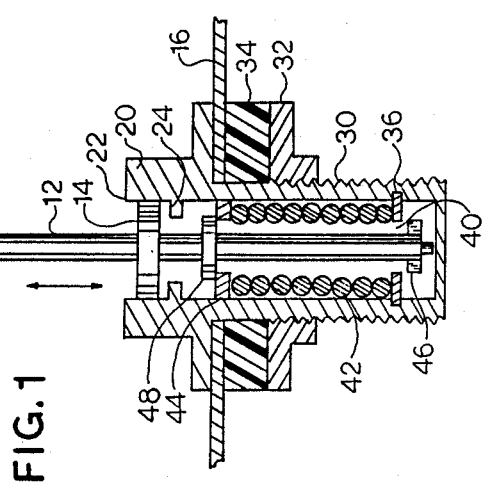
FIG. 3 is a plan view of the key hole plate of FIG. 1.

Turning first to FIG. 1 there is shown a removable hood ornament in accordance with the present invention. The desired ornament 10 is mounted to a shaft 12 which has affixed thereto a beauty ring 14. The beauty ring fills and covers the opening into which the shaft fits and presents an attractive appearance for the device. This ornament is arranged to mount on the hood 16 of a vehicle. The hood is provided with a receptacle 20 having a recess 22 at its upper extremity for receipt of the beauty ring 14. This recess 22 defines a ledge 24 against which the ring 14 resides to provide a secure and clean appearance., The receptacle 20 supports a casing 30 protruding below the hood line. Mounting the casing to the hood is a retainer 32 arranged to compress an intermediate rubber washer 34 between the retainer and the receptacle. Mounted within the casing is a lower ledge 36 having a keyhole 40 (see FIG. 3) defined therein. As shown, the keyhole presents a circular opening to receive the shaft and presents a transverse slot for receipt of transversely protruding key members on the shaft.

Encircling the protruding shaft 12 is a coil spring member 42 lying at its lower end against the ledge 36 and presenting at its upper edge a flat washer 44. At the lower tip of the protruding shaft 12 there is shown the transversely protruding key members 46. When the key is inserted through the keyhole 40, the upper plate 48 (affixed to the shaft) catches the flat washer above the spring and compresses the spring as the shaft is pushed downwardly.

With this first embodiment configuration, the key member 46 of the shaft 12 is positioned within the opening of the receptacle, inserted through the upper flat washer 44 until the fixed ring 48 comes into contact with the spring washer. This causes the spring 42 to compress while the shaft is pressed and the key member 46 is inserted through th ledge 36 via the keyhole 40. Once inserted a quarter turn aligns the hood ornament in the proper orientation and locks the device into place. To further secure the hood ornament, detents may be added to the lower side of the ledge 36 to position the protruding prongs of the key 46.

Figure 2:
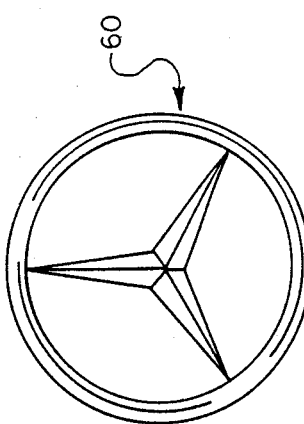
FIG. 2 is a cross sectional view of a second embodiment of the present invention wherein the spring is retained on the shaft extension of the hood ornament.
Figure 2:
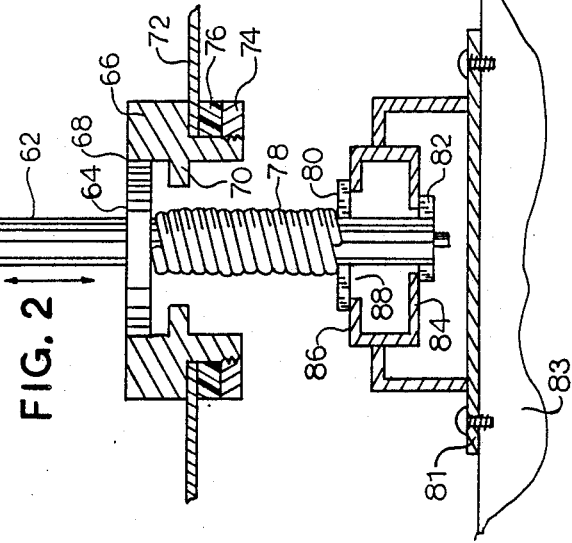

In an alternative embodiment, as shown in FIG. 2, the spring member is carried upon the shaft member. More particularly, there is shown a hood ornament 60 carried on a shaft 62, and having mounted thereon a beauty ring 64. This ring is arranged to mate within a receptacle 66 exhibiting a recess 68 and a supporting ledge 70. This receptacle is affixed to the hood of the vehicle 72 by means of a retaining nut 74 which holds the receptacle to the hood and clamps an intermediate rubber washer 76 therebetween.

In this second embodiment the coil spring member 78 is carried upon the shaft 62 and interposed between the beauty ring 64 and the lower, floating ring 80. When the coil spring is fully extended, this lower ring rests against the prongs of the key member 82.

A lower bracket 81 is affixed to the core support 83 of the vehicle and mounts a keyhole disk 84 and a ring contacting surface 86. When the prongs of the key 82 are inserted through the opening 88, the floating ring 80 comes into contact with the contact disk 86 to cause the spring 78 to compress as the shaft is pushed downwardly. At the same time the prongs of the key 82 are inserted through the keyhole, and as in the first embodiment, a quarter turn of the hood ornament aligns it and locks the device in place.

From the foregoing description, it will be apparent that modifications can be made to the apparatus and method for using same without departing from the teachings of the present invention. Accordingly, the scope of the invention is only to be limited as necessitated by the accompanying claims.

I claim:

1. A detachable ornament apparatus for an automobile hood having a small opening arranged therein for receipt of a portion of said ornament apparatus comprising:

a shaft member;

an ornament mounted to the upper portion of said shaft;

transversely protruding key member prongs affixed to the lower portion of said shaft;

a bracket member affixed to the automobile under the hood;

a lower plate member positioned by said bracket member underneath the hood and having an opening therein in alignment with said hood opening, wherein said lower plate member opening exhibits a transverse elongated slot for receipt of said shaft member and said protruding key member prongs, when aligned therewith; and means mounted within said bracket member for urging said shaft member upwardly such that said prongs are locked against said lower plate member when said key member is inserted through said lower plate opening and rotated to un-align said prongs and said slot.

2. The detachable ornament for the hood of an automobile of claim 1 further comprising an upper plate member affixed to said shaft member, and wherein said means for urging said shaft member upwardly comprises a coil spring mounted to said bracket and arranged to contact said upper plate member when said prongs are inserted through said lower plate opening.

3. The detachable ornament for the hood of an automobile of claim 2 further comprising a receptacle mounted to the hood and arranged to suspend said bracket member therefrom.

4. The detachable ornament for the hood of an automobile of claim 3 wherein said receptacle presents a recess on its upper surface, and further comprising a beauty ring affixed to said shaft member for engaging said receptacle recess.

5. The detachable ornament for the hood of an automobile of claim 1 wherein said bracket member is affixed to the core support of the automobile, and wherein said means for urging said shaft member upwardly comprises a coil spring mounted on said shaft and having slideably mounted at its lower extremity a floating plate arranged to contact said bracket and cause said spring to compress when said prongs are inserted through said lower plate opening.

6. The detachable ornament for the hood of an automobile of claim 5 wherein said bracket member presents a spring compressing plate member above said lower plate member, said compressing plate member having an opening therein to allow passage of said shaft member but arranged to contact said floating plate and compress said spring member.

7. The detachable ornament for the hood of an automobile of claim 6 further comprising a beauty ring affixed to said shaft member and arranged to cover the opening in the hood, and further comprising a receptacle affixed to the hood and arranged to receive said beauty ring.

* * * * *